US010015508B2

(12) United States Patent
Yoshizawa et al.

(10) Patent No.: US 10,015,508 B2
(45) Date of Patent: Jul. 3, 2018

(54) VIDEO ENCODING DEVICE AND VIDEO ENCODING METHOD

(71) Applicants: NTT Electronics Corporation, Kanagawa (JP); Nippon Telegraph and Telephone Corporation, Tokyo (JP)

(72) Inventors: Takeshi Yoshizawa, Kanagawa-ken (JP); Katsuyuki Ozaki, Tokyo (JP); Takayuki Onishi, Kanagawa-ken (JP); Ken Nakamura, Kanagawa-ken (JP)

(73) Assignees: NTT Electronics Corporation (JP); Nippon Telegraph and Telephone Corporation (JP)

( * ) Notice: Subject to any disclaimer, the term of this patent is extended or adjusted under 35 U.S.C. 154(b) by 121 days.

(21) Appl. No.: 15/333,952

(22) Filed: Oct. 25, 2016

(65) Prior Publication Data

US 2017/0127079 A1 May 4, 2017

(30) Foreign Application Priority Data

Oct. 30, 2015 (JP) .................................. 2015-213823

(51) Int. Cl.
*H04N 11/02* (2006.01)
*H04N 19/50* (2014.01)
(Continued)

(52) U.S. Cl.
CPC ........... *H04N 19/50* (2014.11); *H04N 19/172* (2014.11); *H04N 19/90* (2014.11)

(58) Field of Classification Search
CPC .................................................... H04N 19/50
(Continued)

(56) References Cited

U.S. PATENT DOCUMENTS 9,473,789 B2 * 10/2016 Oh .......................... H04N 19/52
9,621,888 B2 * 4/2017 Jeon ....................... H04N 19/57
(Continued)

FOREIGN PATENT DOCUMENTS

JP 2005-244503 A 9/2005
JP 2006-25033 A 1/2006
(Continued)

OTHER PUBLICATIONS

Okubo et al., "H.265/HEVC Textbook", pp. 136-140.
(Continued)

*Primary Examiner* — Leron Beck
(74) *Attorney, Agent, or Firm* — Kilpatrick Townsend & Stockton LLP

(57) ABSTRACT

Before completion of merge encoding processing of an immediately preceding PU, a controller determines the order of evaluation of merge candidates with the immediately preceding PU excluded from the merge candidates to be evaluated, and a merge-candidate derivation part evaluates each merge candidate in the order of evaluation. After the completion of the merge encoding processing of the immediately preceding PU, the controller re-determines the order of evaluation of merge candidates with the immediately preceding PU included in the merge candidates to be evaluated, and the merge-candidate derivation part evaluates each merge candidate in the re-determined order of evaluation excluding the merge candidate whose evaluation has already been started.

4 Claims, 7 Drawing Sheets

(51) Int. Cl.
*H04N 19/172* (2014.01)
*H04N 19/90* (2014.01)

(58) Field of Classification Search
USPC ..................................... 375/240.01–240.29
See application file for complete search history.

(56) References Cited

U.S. PATENT DOCUMENTS

| | | | |
|---|---|---|---|
| 2009/0110077 A1 | 4/2009 | Amano et al. | |
| 2013/0272421 A1 | 10/2013 | Takano et al. | |
| 2013/0343459 A1* | 12/2013 | Bici | H04N 19/00684 375/240.16 |
| 2014/0233654 A1 | 8/2014 | Sato | |
| 2014/0254681 A1* | 9/2014 | Aminlou | H04N 19/105 375/240.16 |
| 2014/0301461 A1* | 10/2014 | Jeon | H04N 19/00678 375/240.12 |
| 2014/0355666 A1* | 12/2014 | Zhang | H04N 19/52 375/240.02 |

FOREIGN PATENT DOCUMENTS

| | | |
|---|---|---|
| JP | 2009-55254 A | 3/2009 |
| WO | 2007/136088 A1 | 11/2007 |
| WO | 2012/086829 A1 | 6/2012 |
| WO | 2013/069557 A1 | 5/2013 |
| WO | 2013/112729 A2 | 8/2013 |
| WO | 2013/112729 A3 | 8/2013 |

OTHER PUBLICATIONS

Office Action, Japanese Patent Application No. 2015-213823, dated Jul. 19, 2016.

Kim, et al., "CU-based Merge Candidate List Construction", 98. MPEG Meeting, Nov. 28, 2011-Feb. 12, 2011, Geneva, No. m21980, Nov. 21, 2011, pp. 1-3.

Jeon et al., "Non-CE9: Parallel Merge Candidate Derivation for Inter_NxN Partition Type", 8. JCT-VC Meeting; 99. MPEG Meeting; Feb. 1, 2012-Feb. 10, 2012; San Jose, http://WFTP3.ITU.INT/AV-ARCH/JCTVC-Site/, No. JCTVC-H0091, Jan. 20, 2012, pp. 1-2.

European Search Report, European Patent Application No. 16193276.9, dated Mar. 29, 2017.

* cited by examiner

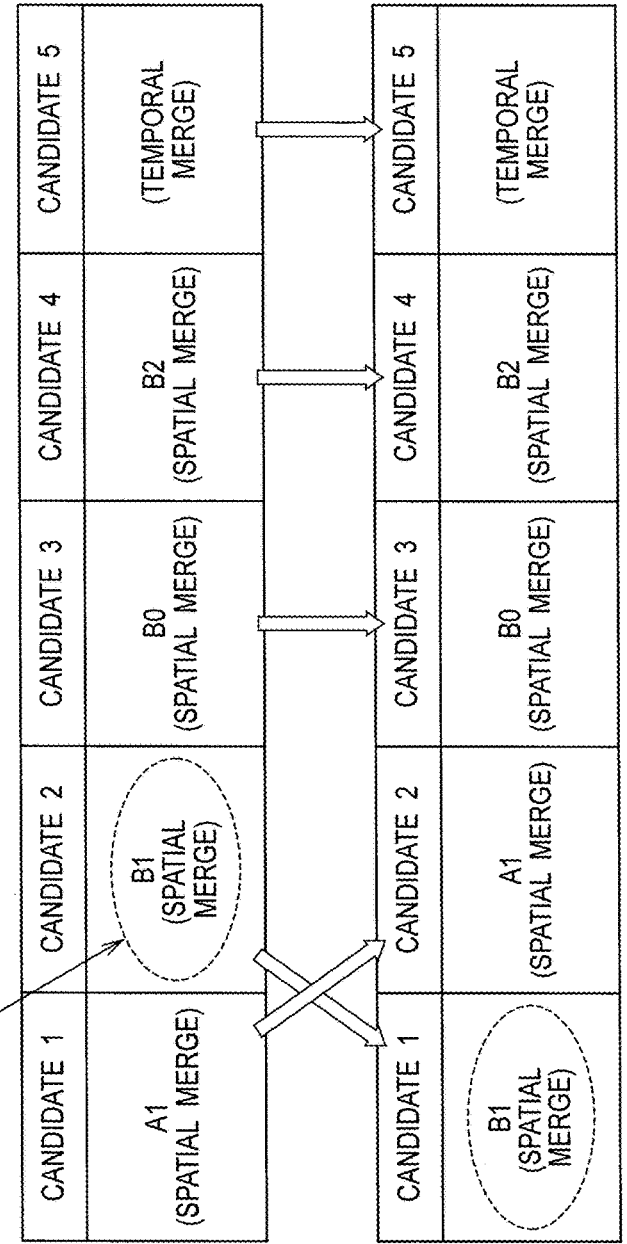

VIDEO ENCODING DEVICE AND VIDEO ENCODING METHOD

CROSS REFERENCE TO RELATED APPLICATION

This application claims benefit of priority under 35 USC 119 based on Japanese Patent Application 2015-213823 filed Oct. 30, 2015, the entire contents of which are incorporated by reference herein.

BACKGROUND OF THE INVENTION

1. Field of the Invention

The present invention relates to a video encoding device configured to encode a video, and particularly relates to an inter-frame prediction (inter prediction) technique.

2. Description of the Related Art

The video encoding device uses a predictive encoding technique that involves: generating a predicted picture based on a locally decoded picture obtained by encoding/decoding an input picture (current picture) within the video encoding device; and encoding a predicted residual obtained by subtracting the predicted picture from the input picture. Meanwhile, the predicted residual is also called a difference picture or residual picture.

The video encoding standard "H.265/HEVC," developed by the international standardization organizations ITU-T and ISO/IEC together, employs two types of encoding schemes, namely, advanced motion vector prediction encoding and merge encoding, for inter-frame prediction. The merge encoding is a technique that involves: based on motion information on a plurality of encoded blocks neighboring a block to be encoded, selecting the block with the most similar motion information (merge candidate); and encoding only an index corresponding to the position of the merge candidate.

The merge encoding does not involve encoding a motion vector, a reference picture index, or the like, and is therefore capable of reducing the amount of encoding as compared to the advanced motion vector prediction encoding.

For not only merge encoding but also other video encoding, the video encoding device divides the video encoding processing into a plurality of sub processes, and executes these sub processes in parallel. That is, the video encoding device generally performs pipeline processing when executing processing related to video encoding.

However, when a conventional video encoding device attempts to process merge encoding in parallel, a block neighboring a block to be encoded is sometimes being processed. In this case, the video encoding device cannot start processing the block to be encoded, until the processing of the neighboring block is completed.

SUMMARY OF THE INVENTION

An object of the present invention is to perform efficient merge encoding processing.

A video encoding device according to a first aspect of the present invention is a video encoding device including an inter predictor configured to perform merge encoding processing on prediction units in a predetermined order, the prediction units being obtained by dividing a picture of a video, in which the inter predictor includes an evaluation-order determination part configured to determine merge candidates for a current prediction unit, which is a processing target, and an order of evaluation of the merge candidates, a merge-candidate derivation part configured to sequentially evaluate the merge candidates and calculate costs of the merge candidates in the order of evaluation, a merge-candidate determination part configured to output a merge index corresponding to a position of the merge candidate with the smallest cost among the costs calculated by the merge-candidate derivation part, and a merge encoder configured to encode the merge index with a predetermined encoding scheme, and before completion of the merge encoding processing of a prediction unit immediately preceding the current prediction unit, the evaluation-order determination part determines a first order of evaluation with the immediately preceding prediction unit excluded from the merge candidates to be evaluated and, after the completion of the merge encoding processing of the immediately preceding prediction unit, the evaluation-order determination part determines a second order of evaluation with the immediately preceding prediction unit included in the merge candidates to be evaluated.

A video encoding method according to a second aspect of the present invention is a video encoding method to be implemented by a video encoding device including an inter predictor configured to perform merge encoding processing on prediction units in a predetermined order, the prediction units being obtained by dividing a picture of a video, including the steps of: determining merge candidates for a current prediction unit, which is a processing target, and an order of evaluation of the merge candidates; sequentially evaluating the merge candidates and calculating costs of the merge candidates in the order of evaluation; outputting a merge index corresponding to a position of the merge candidate with the smallest cost among the costs; and encoding the merge index with a predetermined encoding scheme, in which the step of determining the order of evaluation includes, before completion of the merge encoding processing of a prediction unit immediately preceding the current prediction unit, determining a first order of evaluation with the immediately preceding prediction unit excluded from the merge candidates to be evaluated and, after the completion of the merge encoding processing of the immediately preceding prediction unit, determining a second order of evaluation with the immediately preceding prediction unit included in the merge candidates to be evaluated.

BRIEF DESCRIPTION OF THE DRAWINGS

FIGS. 7A to 7C are diagrams illustrating orders of evaluation of merge candidates.

DESCRIPTION OF THE EMBODIMENT

An embodiment of the present invention will be described below with reference to the drawings.

Figure 1:
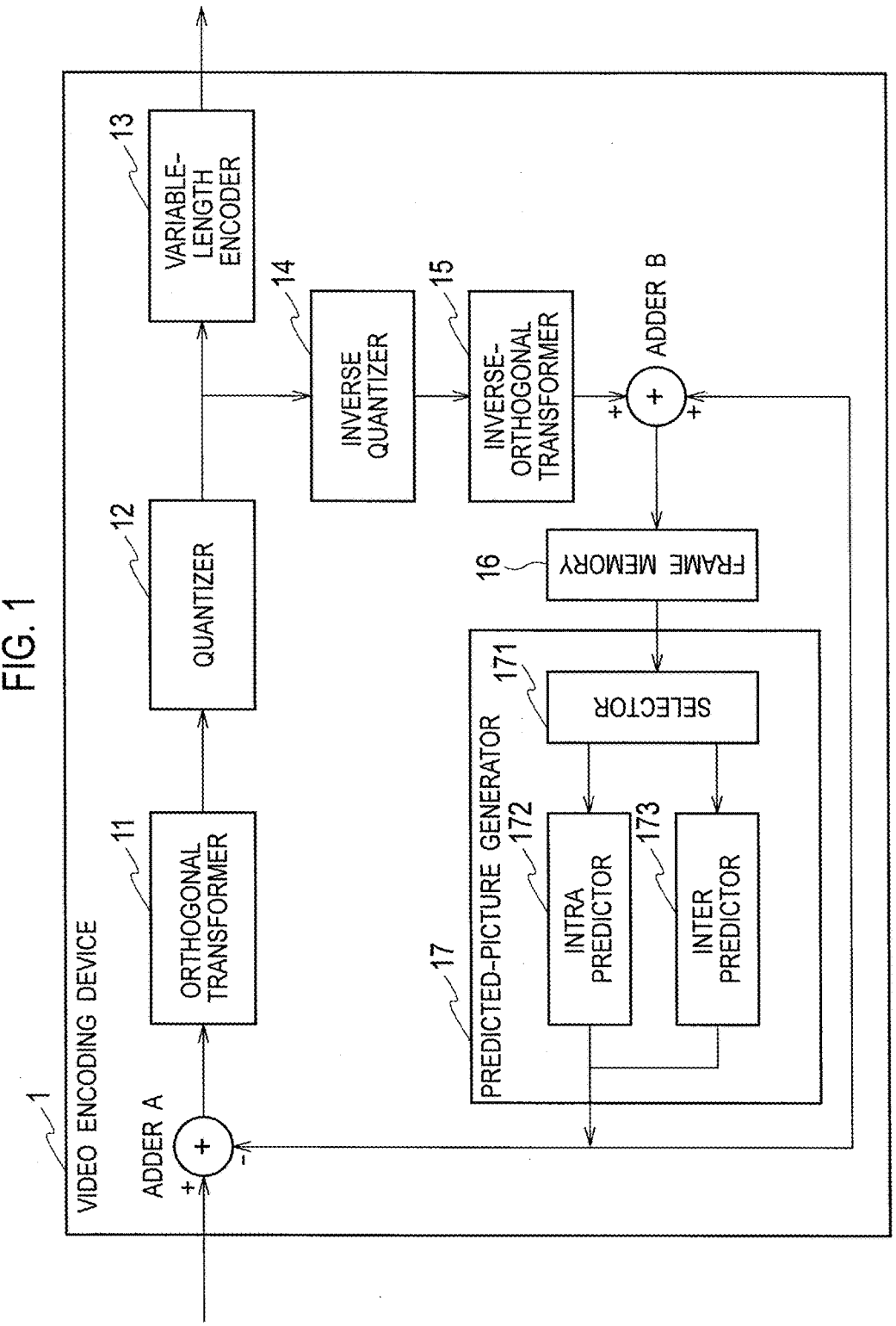
FIG. 1 is a functional block diagram illustrating the configuration of a video encoding device in an embodiment.

A video encoding device 1 illustrated in FIG. 1 includes an adder A, an orthogonal transformer 11, a quantizer 12, a variable-length encoder 13, an inverse quantizer 14, an inverse-orthogonal transformer 15, an adder B, a frame memory 16, and a predicted-picture generator 17.

The adder A is configured to generate a predicted residual by subtracting a predicted picture generated by the predicted-picture generator 17 from an input picture, which is a current picture. The orthogonal transformer 11 is configured to perform orthogonal transform such as discrete cosine transform on the predicted residual. The quantizer 12 is configured to quantize the transform coefficients of the predicted residual subjected to the orthogonal transform. The variable-length encoder 13 is configured to encode the quantized transform coefficients of the predicted residual with a predetermined encoding scheme capable of lossless processing, and output the encoded transform coefficients to, for example, a transfer path, a record medium, or the like.

While the output of the quantizer 12 is inputted into the variable-length encoder 13, the output is also inputted into the inverse quantizer 14. The inverse quantizer 14 is configured to inversely quantize the output of the quantizer 12 to decode the transform coefficients of the predicted residual. The inverse-orthogonal transformer 15 is configured to perform inverse orthogonal transform on the output of the inverse quantizer 14 to decode the predicted residual. The adder B is configured to add a predicted picture generated by the predicted-picture generator 17 and the predicted residual decoded by the inverse-orthogonal transformer 15, to generate a locally decoded picture. The frame memory 16 is configured to store the locally decoded picture and the current picture and output the locally decoded picture to the predicted-picture generator 17 at a predetermined timing.

The predicted-picture generator 17 includes a selector 171, an intra predictor 172, and an inter predictor 173. The selector 171 is configured to select a destination to which to supply the locally decoded pictures or the current picture outputted from the frame memory 16. The intra predictor 172 is configured to generate a predicted picture by performing in-frame prediction (intra prediction) using pixel values of the current picture supplied from the selector 171 on the basis of a correlation between neighboring pixels. The inter predictor 173 is configured to generate a predicted picture by performing inter-frame prediction (inter prediction) using motion information on an encoding target detected from a frame preceding or following the locally decoded picture supplied from the selector 171. The predicted pictures generated by the predicted-picture generator 17 are outputted to the adder A and the adder B.

Figure 2:
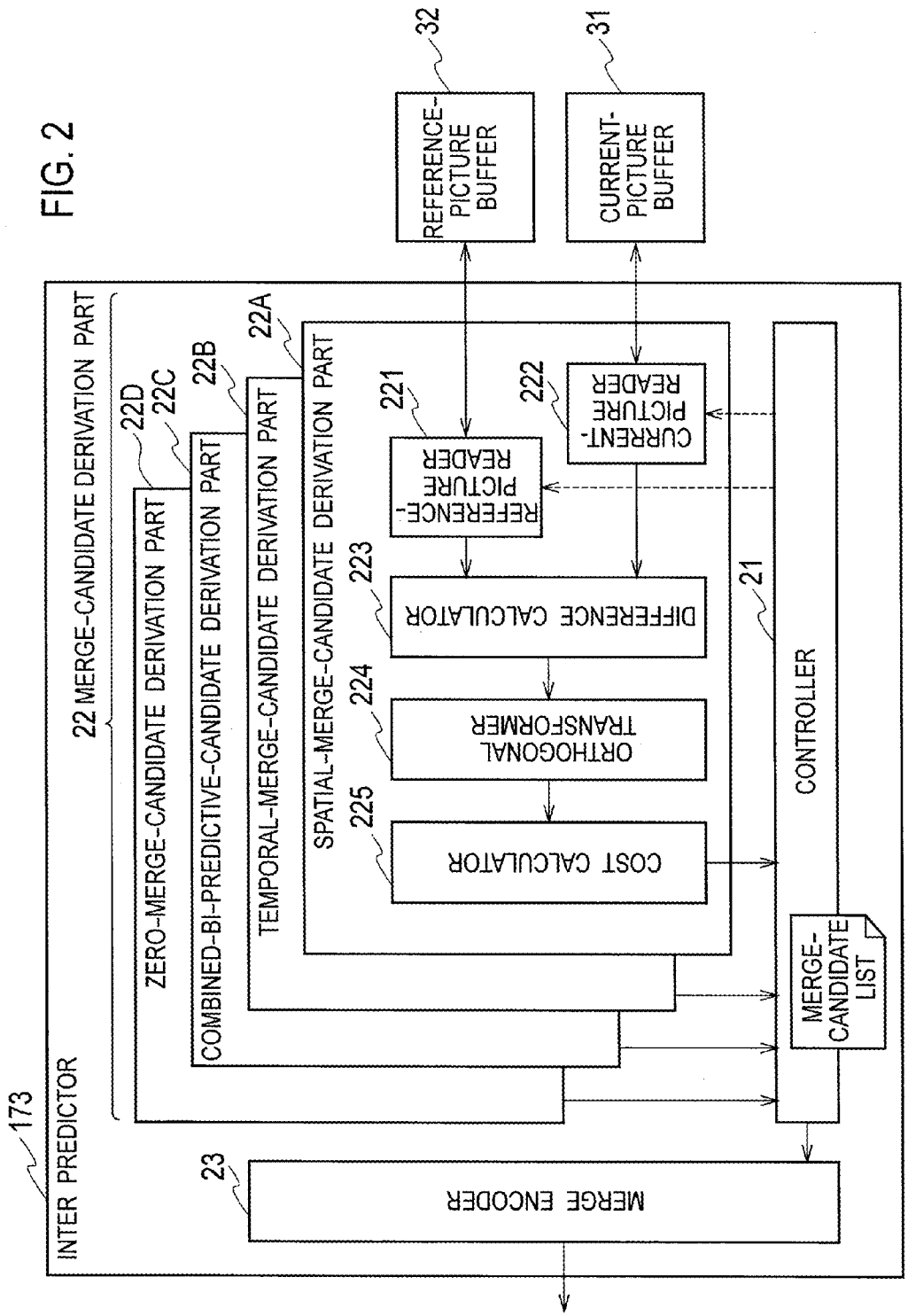
FIG. 2 is a functional block diagram illustrating the configuration of an inter predictor in the video encoding device in FIG. 1.

Next, the configuration of the inter predictor 173 will be described. The inter predictor 173 illustrated in FIG. 2 includes a controller 21, a spatial-merge-candidate derivation part 22A, a temporal-merge-candidate derivation part 22B, a combined-bi-predictive-candidate derivation part 22C, a zero-merge-candidate derivation part 22D, and a merge encoder 23. The spatial-merge-candidate derivation part 22A includes a reference-picture reader 221, a current-picture reader 222, a difference calculator 223, an orthogonal transformer 224, and a cost calculator 225. The temporal-merge-candidate derivation part 22B, the combined-bi-predictive-candidate derivation part 22C, and the zero-merge-candidate derivation part 22D have substantially the same configuration as the spatial-merge-candidate derivation part 22A. The spatial-merge-candidate derivation part 22A, the temporal-merge-candidate derivation part 22B, the combined-bi-predictive-candidate derivation part 22C, and the zero-merge-candidate derivation part 22D will be referred to as the merge-candidate derivation part 22. A current-picture buffer 31 and a reference-picture buffer 32 are connected to the inter predictor 173. The current-picture buffer 31 is configured to buffer the current picture stored in the frame memory 16. The reference-picture buffer 32 is configured to buffer a reference picture stored in the frame memory 16.

The controller 21 is configured to perform the following processes.

[Merge-Candidate-Evaluation-Order Determination Process]

The controller 21 determines an order of evaluation of merge candidates for the current prediction unit (PU), which is a processing target. In this embodiment, the merge-candidate-evaluation-order determination process includes an advance evaluation-order determination process executed before processing of the PU immediately preceding the current PU is completed, and a final evaluation-order determination process executed when the processing of the immediately preceding PU is completed. Details of these processes will be described later.

[Reference-Picture Read Request Process]

Based on position information and motion information on each merge candidate to be evaluated, the controller 21 figures out address information on a reference region in the reference picture, and instructs the reference-picture reader 221 to read out picture data of the reference region from the reference-picture buffer 32.

[Current-Picture Read Request Process]

The controller 21 instructs the current-picture reader 222 to read out the picture data of the current PU from the current-picture buffer 31.

[Merge-Candidate Output Process]

The controller 21 receives the values of costs outputted from the cost calculator 225, registers the values on a merge-candidate list, selects the merge candidate with the smallest cost, and outputs a merge index (merge_idx) corresponding to the position of the merge candidate.

Following the reference-picture read request from the controller 21, the reference-picture reader 221 reads out the picture data of the reference region from the reference-picture buffer 32, generates predicted picture data by performing fractional sample interpolation filter processing, and outputs the predicted picture data to the difference calculator 223. Following the current-picture read request from the controller 21, the current-picture reader 222 reads out the picture data of the current PU from the current-picture buffer 31 and outputs it to the difference calculator 223. The difference calculator 223 calculates the absolute values of the pixel differences between the predicted picture data and the picture data of the current PU and outputs them to the orthogonal transformer 224. The difference calculator 223 is also called the sum of absolute differences (SAD). The orthogonal transformer 224 performs orthogonal transform such as the Hadamard transform on the absolute values of the pixel differences, which are the output of the difference calculator 223, and outputs the result to the cost calculator 225. The cost calculator 225 calculates the cost of the merge candidate by addition of the coefficient of each pixel obtained as the output of the orthogonal transformer 224 and multiplication by a predetermined weighting coefficient. The value of the cost calculated by the cost calculator 225 is outputted to the controller 21.

The merge encoder 23 is configured to encode the merge index (merge_idx), outputted from the controller 21, with a predetermined encoding scheme.

Now, merge encoding will be schematically described with reference to FIG. 3.

A coding tree unit (CTU) is the smallest unit of picture division, and is any of 64×64 pixels, 32×32 pixels, and 16×16 pixels in H.265/HEVC. The CTU is divided into coding units (CUs) (not illustrated in FIG. 3). The CUs are divided into PUs, each of which is the basic unit of prediction processing. The PUs included in a single CTU do not have to be identical in size, as illustrated in FIG. 3. For example, it is possible to set a large PU for a region in a CTU where the motions and colors change slightly, and set a small PU for a region where the motions and colors change greatly. As illustrated by the dotted arrows in FIG. 3, the order of processing of the PUs in a CTU is a Z-shaped order such as upper left PU→upper right PU→lower left PU→lower right PU. This order of processing remains the same also for a CTU in which PUs of different sizes are mixed.

For the current PU, the controller 21 determines the order of evaluation, evaluates (derives) merge candidates, and constructs a merge-candidate list. On the merge-candidate list, merge candidates, namely, spatial merge candidates, temporal merge candidates, combined bi-predictive candidates, and zero merge candidates are evaluated and registered in this order.

Figure 3:
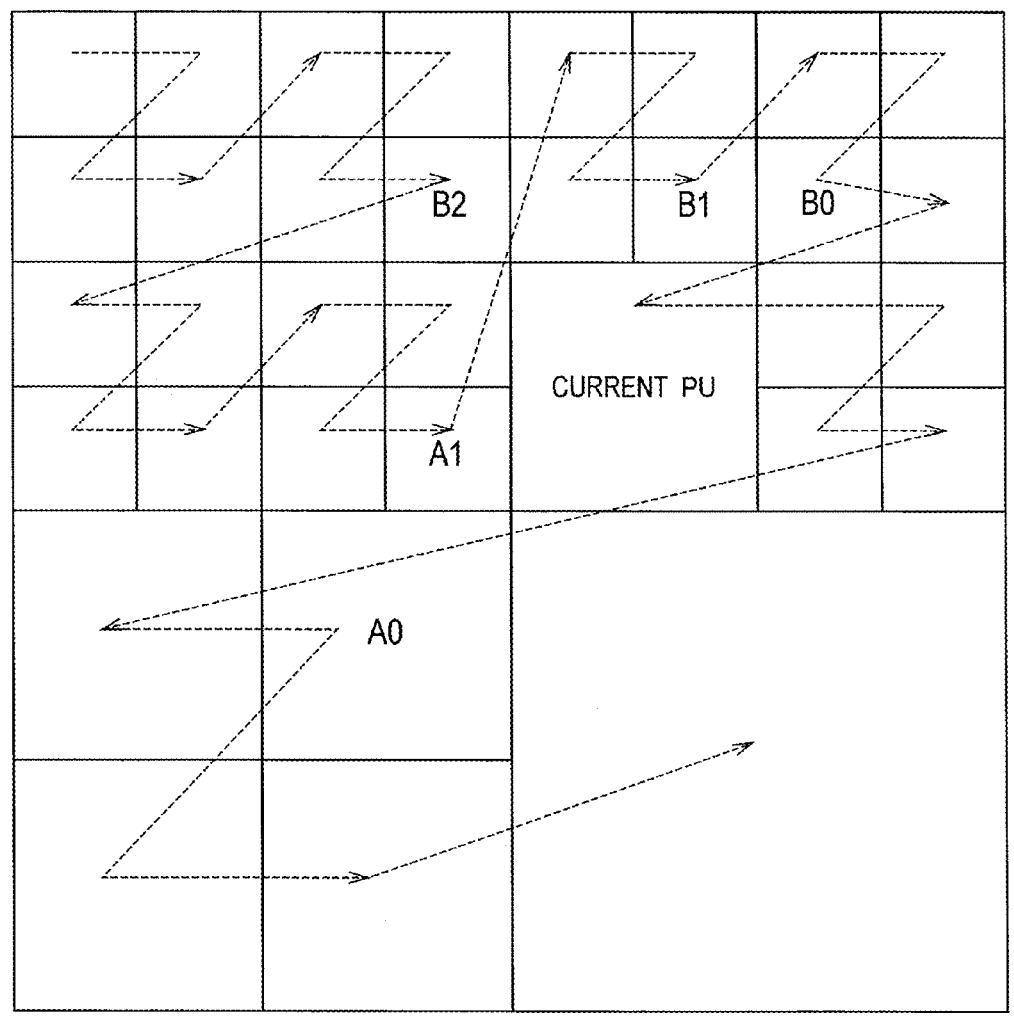
FIG. 3 is a diagram illustrating a coding tree unit contained in a picture to be encoded, prediction units contained in the coding tree unit, and the order of processing of the prediction units.

As for the spatial merge candidates, A1 (the lowermost PU among the PUs neighboring the left side of the current PU), B1 (the rightmost PU among the PUs neighboring the upper side of the current PU), B0 (the PU neighboring the upper right corner of the current PU), A0 (the PU neighboring the lower left corner of the current PU), and B2 (the PU neighboring the upper left corner of the current PU) (hereinafter, these PUs will be referred to as "neighboring PU(s)") illustrated in FIG. 3 are evaluated as spatial merge candidates in the order of A1→B1→B0→A0→B2, and up to four spatial merge candidates are registered on the merge-candidate list. In a case where the four spatial merge candidates at A1, B1, B0, and A0 are registered on the merge-candidate list, the spatial merge candidate at B2 is not evaluated. Also, those neighboring PUs whose motion information cannot be utilized (such as neighboring PUs that are situated outside the CTU or neighboring PUs whose motion information has not yet been set), and those neighboring PUs that have the same motion information as neighboring PUs that have already been evaluated, are not regarded as spatial merge candidates to be evaluated.

Figure 4:
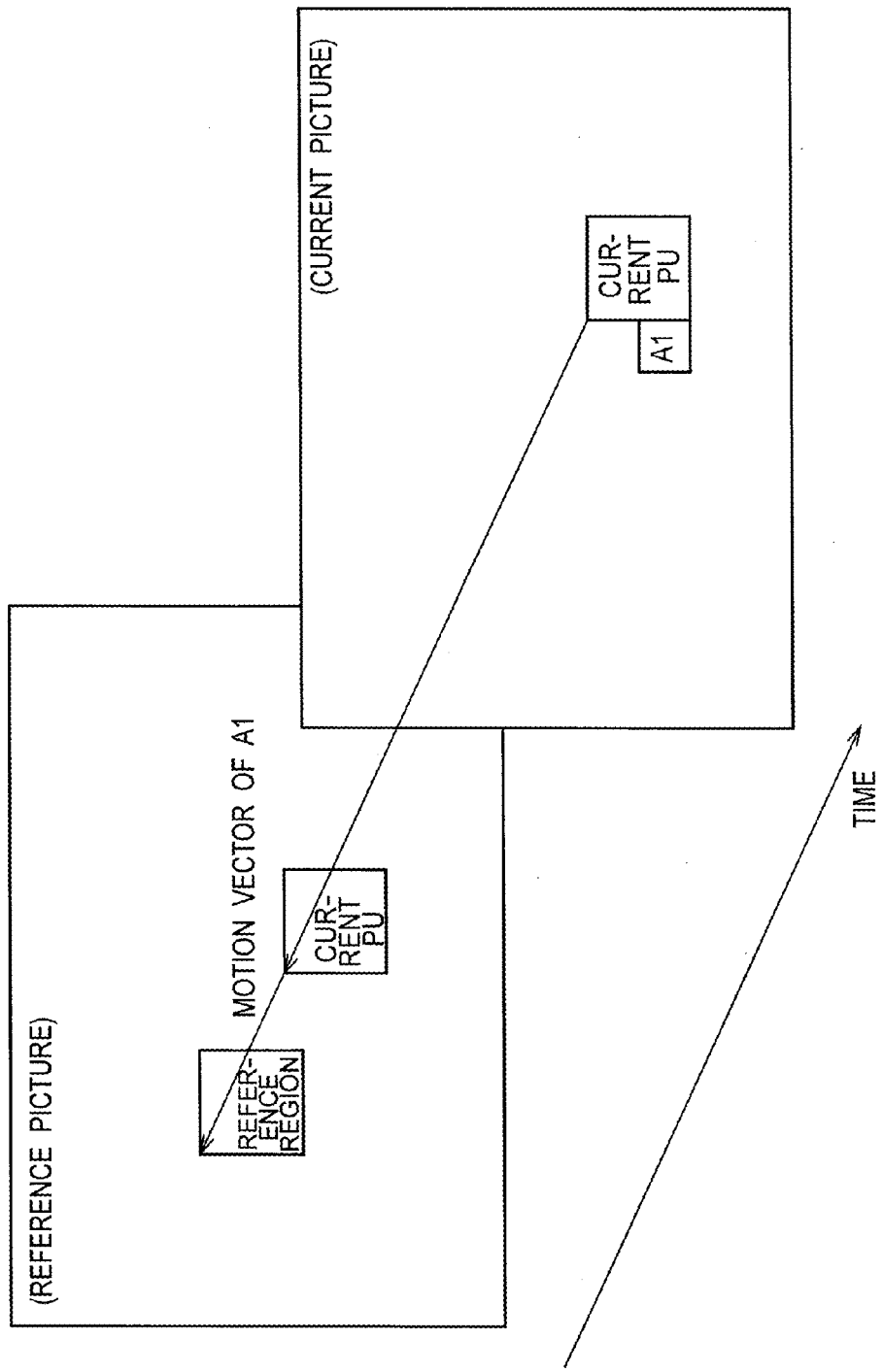
FIG. 4 is a diagram illustrating the position of a reference region in a reference picture.

In the evaluation of the spatial merge candidates, each neighboring PU is subjected to the following processing including:

(1) referring to the motion information of the neighboring PU and acquiring the position of the current PU in the reference picture which this neighboring PU is referring to (the current PU in the reference picture in FIG. 4);

(2) acquiring the picture data of the position which the motion vector of the neighboring PU (A1 in FIG. 4) points at from the current PU in the reference picture (the reference region in FIG. 4);

(3) calculating the difference between the picture data of the current PU in the current picture and a predicted picture generated from the picture data of the reference region, and performing orthogonal transform on the result of the calculation; and (4) calculating the "cost" between the current PU and the reference region by addition of the coefficient of each pixel which is obtained as the result of the orthogonal transform and multiplication by a predetermined weighting coefficient.

Up to four merge candidates are registered on the merge-candidate list. After the evaluation of the spatial merge candidates, the temporal merge candidates, the combined bi-predictive candidates, and the zero merge candidates are evaluated in this order and registered on the merge-candidate list until up to five merge candidates including the spatial merge candidates are stored on the merge-candidate list.

The merge candidate with the smallest cost on the merge-candidate list is predicted to have the closest motion information to the motion information of the current PU. The controller 21 selects the merge candidate with the smallest cost from the constructed merge-candidate list, and outputs a merge index (merge_idx) corresponding to the selected merge candidate. The merge encoder 23 encodes the merge index (merge_idx) with a predetermined encoding scheme.

Next, pipeline processing in the merge encoding will be described.

The inter predictor 173 performs the processes in the merge encoding processing in parallel at the controller 21, the merge-candidate derivation part 22, and the merge encoder 23.

Figure 5:
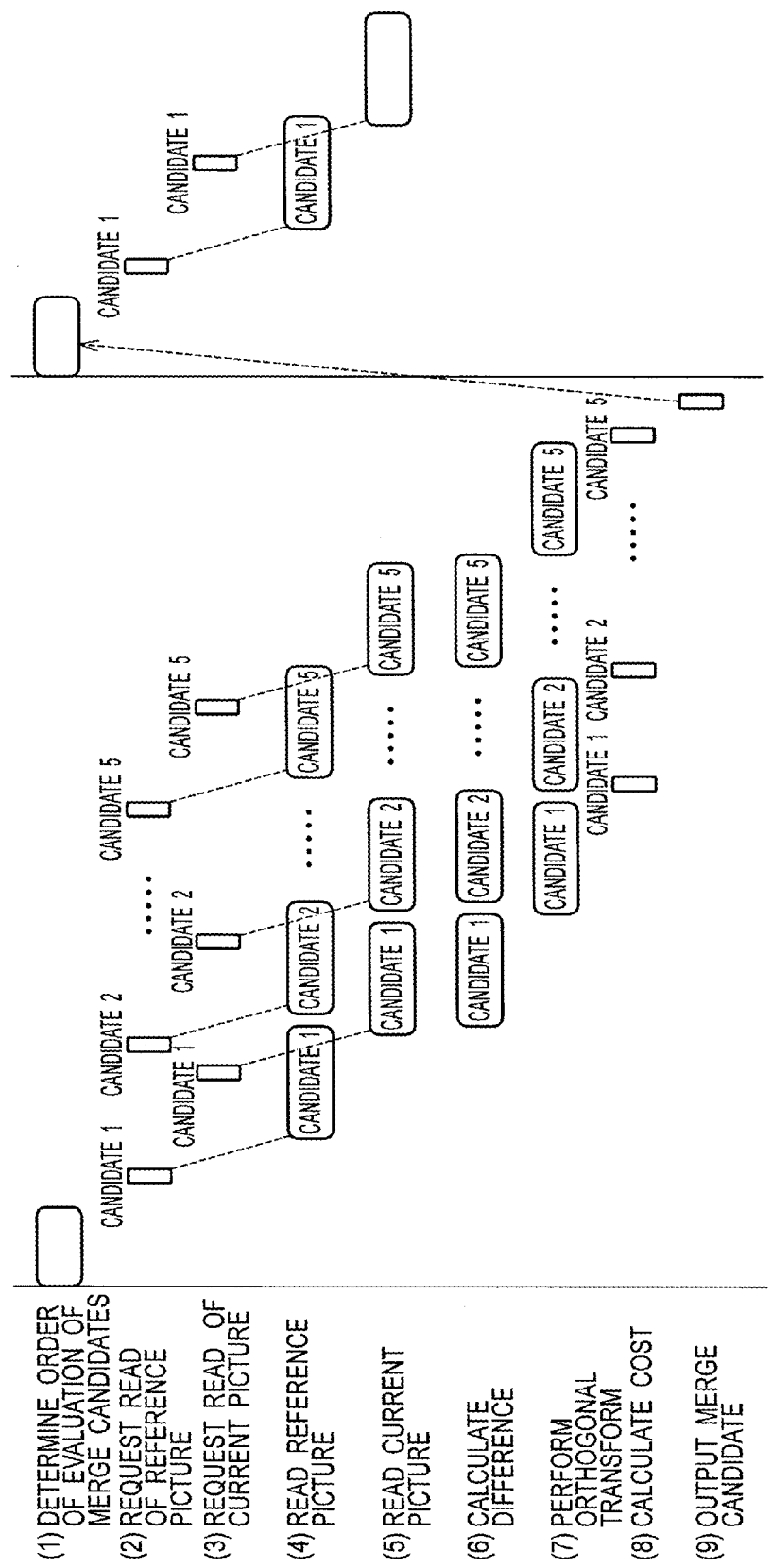
FIG. 5 is a chart for explaining pipeline processing in conventional merge encoding.

First, pipeline processing in conventional merge encoding will be described. FIG. 5 illustrates (1) a process of determining the order of evaluation of merge candidates, (2) a process of requesting read reference picture, (3) a process of requesting read current picture, (4) a reference-picture read process, (5) a current-picture read process, (6) a difference calculation process, (7) an orthogonal transform process, (8) a cost calculation process, and (9) a merge-candidate output process. Each process will be described below.

(1) Process of Determining the Order of Evaluation of Merge Candidates

The controller 21 determines the order of evaluation of merge candidates. Assuming for example that the current PU in FIG. 3 is the processing target, the PU at AO is "an invalid neighboring PU whose motion information cannot be utilized" and is excluded from the evaluation targets. In this case, the controller 21 determines the four of A1 (spatial merge), B1 (spatial merge), B0 (spatial merge), and B2 (spatial merge) as evaluation targets and the order of evaluation. The controller 21 determines to perform another temporal merge so that five merge candidates will be registered on the merge-candidate list.

The inter predictor 173 starts to evaluate the merge candidates in the order of evaluation determined in (1), and performs the following processes (2) to (8) for each merge candidate.

(2) Process of Requesting Read Reference Picture

The controller 21 instructs the reference-picture reader 221 to read out the picture data of the reference region.

(3) Process of Requesting Read Current Picture

The controller 21 instructs the current-picture reader 222 to read out the picture data of the current PU from the current picture.

(4) Reference-Picture Read Process

Following the instruction from the controller 21, the reference-picture reader 221 reads out the picture data of the reference region from the reference-picture buffer 32, and generates predicted picture data by performing the fractional sample interpolation filter processing. The reference-picture reader 221 outputs the predicted picture data to the difference calculator 223.

(5) Current-Picture Read Process

Following the instruction from the controller 21, the current-picture reader 222 reads out the picture data of the current PU from the current-picture buffer 31, and outputs it to the difference calculator 223.

Then, the controller 21 instructs the reference-picture reader 221 to read out the picture data of the reference region for the next merge candidate when the reference-picture reader 221 becomes available to read out the picture data of the reference region. Similarly, the controller 21 instructs the current-picture reader 222 to read out the picture data of the current PU for the next merge candidate when the current-picture reader 222 becomes available to read out the picture data of the current PU.

(6) Difference Calculation Process

Substantially in synchronization with the picture data of the current PU received from the current-picture reader 222, the difference calculator 223 calculates the absolute values of the pixel differences between the predicted picture data and the picture data of the current PU, and outputs the absolute values to the orthogonal transformer 224.

(7) Orthogonal Transform Process

The orthogonal transformer 224 performs orthogonal transform on the absolute values of the pixel differences, received from the difference calculator 223, and outputs the result to the cost calculator 225.

(8) Cost Calculation Process

The cost calculator 225 calculates the cost of each merge candidate for the current PU from the coefficient of each pixel obtained as the output of the orthogonal transformer 224, and outputs the cost to the controller 21.

The controller 21 registers the cost, received from the cost calculator 225, on the merge-candidate list.

(9) Merge-Candidate Output Process

After the evaluation of the five merge candidates is completed, the controller 21 selects the merge candidate with the smallest cost from the merge-candidate list, and outputs a merge index (merge_idx) corresponding to the position of the merge candidate.

In the conventional merge encoding processing, it is after the completion of the above-described processes (1) to (9) that the next PU is subjected to the merge encoding processing. That is, in the conventional merge encoding processing, the next PU is subjected to the merge encoding processing after waiting for the completion of the merge encoding processing of the immediately preceding PU. This makes it impossible to perform efficient merge encoding processing.

Figure 6:
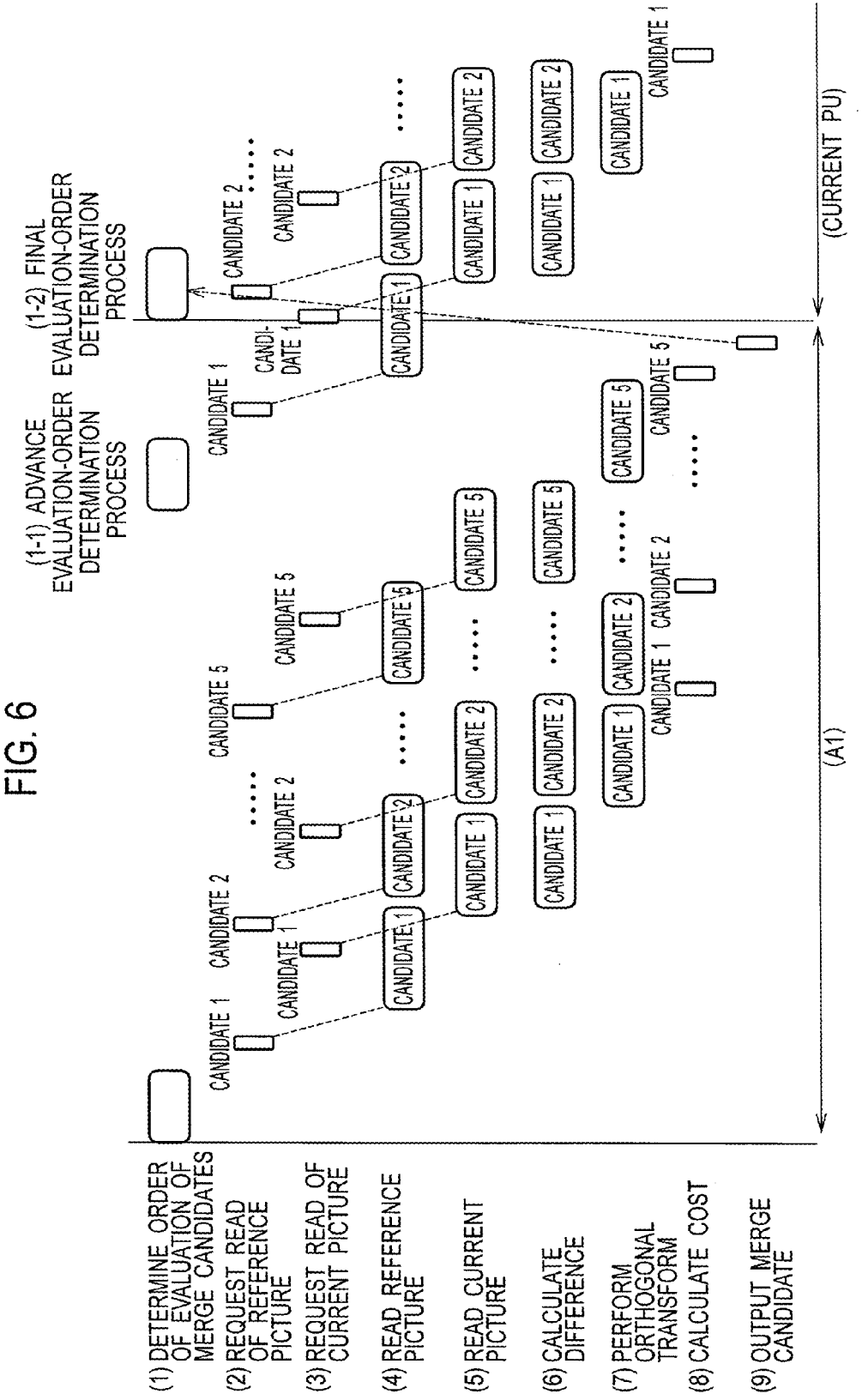
FIG. 6 is a chart for explaining pipeline processing in merge encoding in the embodiment.

Next, the pipeline processing in the merge encoding in this embodiment will be described with reference to FIG. 6. In this embodiment, the controller 21 starts the process of determining the order of evaluation of merge candidates without waiting for the completion of the merge encoding processing of the immediately preceding PU. Since the merge encoding processing of the immediately preceding PU has not yet been completed, the immediately preceding PU will not be a spatial merge candidate to be evaluated if the immediately preceding PU is any one of A0, A1, B0, B1, and B2, although this immediately preceding PU is supposed to be an evaluation target. For this reason, in this embodiment, (1-1) the advance evaluation-order determination process and (1-2) the final evaluation-order determination process are performed as the process of determining the order of evaluation of merge candidates, so that the merge-candidate list is constructed properly. The advance evaluation-order determination process and the final evaluation-order determination process will be described below.

(1-1) Advance Evaluation-Order Determination Process

The controller 21 does not wait for the completion of the merge encoding processing of the immediately preceding PU, but regards the immediately preceding PU as "an invalid neighboring PU whose motion information cannot be utilized" and determines a first order of evaluation of merge candidates. Assume for example that the processing of PUs corresponding to B0, B1, and B2 around the current PU has been completed, and the immediately preceding PU to be processed before the current PU is a PU corresponding to A1 and A1 is being processed. In this case, as illustrated in FIG. 6, the controller 21 performs the advance evaluation-order determination process on the current PU while A1 is being processed, so that the first order of evaluation is determined with the three of B1 (spatial merge), B0 (spatial merge), and B2 (spatial merge) as evaluation targets (a PU corresponding to A0 around the current PU is assumed in this example to be processed after the current PU). In order to register five merge candidates on the merge candidate list, the controller 21 determines to further perform temporal merge and combined bi-predictive merge. FIG. 7A illustrates merge candidates to be evaluated and the first order of evaluation determined by the advance evaluation-order determination process. The controller 21 may determine to perform temporal merge and zero merge instead. Note that the advance evaluation-order determination process may be performed while the immediately preceding PU is being subjected to its merge encoding processing and the controller 21 is in an idle state; the advance evaluation-order determination process does not necessarily have to be performed after the current-picture read request process for the fifth merge candidate as illustrated in FIG. 6.

The controller 21 starts to evaluate the merge candidates in the first order determined by the advance evaluation-order determination process, and the processes (2) to (8) are performed as in the conventional method. In the example of FIG. 7A, the controller 21 starts to evaluate B1 (spatial merge).

(1-2) Final Evaluation-Order Determination Process

When the merge encoding processing of the immediately preceding PU is completed, the controller 21 determines a second order of evaluation of merge candidates. Assume for example that the current PU in FIG. 3 is the processing target, and the controller 21 performs the final evaluation-order determination process when the merge encoding processing of A1 is completed. In this case, A1 is an evaluation target, and the controller 21 thus determines the second order of evaluation with the four of A1 (spatial merge), B1 (spatial merge), B0 (spatial merge), and B2 (spatial merge) as evaluation targets. The controller 21 determines to further perform temporal merge. FIG. 7B illustrates the merge candidates to be evaluated and the second order of evaluation determined by the final evaluation-order determination process. The controller 21 compares the first order of evaluation and the second order of evaluation. In the first order of evaluation, the controller 21 maintains the order of evaluation of the merge candidate whose processing has been started, while the controller 21 reconstructs the second order of evaluation of the other merge candidates. In the example of FIGS. 7A to 7C, the processing of B1 (spatial merge) has been started and the controller 21 maintains B1 (spatial merge) as the first merge candidate; on the other hand, as illustrated in FIG. 7C, the controller 21 reconstructs the second order of evaluation of the merge candidates other than B1 (spatial merge), namely, A1 (spatial merge), B0 (spatial merge), B2 (spatial merge), and the temporal merge. Thereafter, the controller 21 evaluates the merge candidates in the second order of evaluation in FIG. 7C, namely, in the order of A1 (spatial merge), B0 (spatial merge), B2 (spatial merge), and the temporal merge.

As described above, in this embodiment, before the completion of the merge encoding processing of the immediately preceding PU, the controller 21 determines the order of evaluation of merge candidates with the immediately preceding PU excluded from the merge candidates to be evaluated, and the merge-candidate derivation part 22 evaluates each merge candidate in the order of evaluation; and after the completion of the merge encoding processing of the immediately preceding PU, the controller 21 re-determines the order of evaluation of merge candidates with the immediately preceding PU included in the merge candidates to be evaluated, and the merge-candidate derivation part 22 evaluates each merge candidate in the re-determined order of evaluation excluding the merge candidate whose evaluation has already been started. In this way, efficient merge encoding processing can be performed.

What is claimed is:

1. A video encoding device comprising an inter predictor configured to perform merge encoding processing on prediction units in a predetermined order, the prediction units being obtained by dividing a picture of a video, wherein
the inter predictor includes
an evaluation-order determination part configured to determine merge candidates for a current prediction unit, which is a processing target, and an order of evaluation of the merge candidates,
a merge-candidate derivation part configured to sequentially evaluate the merge candidates and calculate costs of the merge candidates in the order of evaluation,
a merge-candidate determination part configured to output a merge index corresponding to a position of the merge candidate with the smallest cost among the costs calculated by the merge-candidate derivation part, and
a merge encoder configured to encode the merge index with a predetermined encoding scheme, and
before completion of the merge encoding processing of a prediction unit immediately preceding the current prediction unit, the evaluation-order determination part determines a first order of evaluation with the immediately preceding prediction unit excluded from the merge candidates to be evaluated and, after the completion of the merge encoding processing of the immediately preceding prediction unit, the evaluation-order determination part determines a second order of evaluation with the immediately preceding prediction unit included in the merge candidates to be evaluated.

2. The video encoding device according to claim 1, wherein the merge-candidate derivation part evaluates the merge candidates in the first order of evaluation and, after the second order of evaluation is determined, evaluates the merge candidates in the second order of evaluation excluding a merge candidate whose evaluation has already been started.

3. A video encoding method to be implemented by a video encoding device including an inter predictor configured to perform merge encoding processing on prediction units in a predetermined order, the prediction units being obtained by dividing a picture of a video, comprising the steps of:
determining merge candidates for a current prediction unit, which is a processing target, and an order of evaluation of the merge candidates;
sequentially evaluating the merge candidates and calculating costs of the merge candidates in the order of evaluation;
outputting a merge index corresponding to a position of the merge candidate with the smallest cost among the costs; and
encoding the merge index with a predetermined encoding scheme, wherein
the step of determining the order of evaluation includes, before completion of the merge encoding processing of a prediction unit immediately preceding the current prediction unit, determining a first order of evaluation with the immediately preceding prediction unit excluded from the merge candidates to be evaluated and, after the completion of the merge encoding processing of the immediately preceding prediction unit, determining a second order of evaluation with the immediately preceding prediction unit included in the merge candidates to be evaluated.

4. The video encoding method according to claim 3, wherein the step of calculating the costs includes evaluating the merge candidates in the first order of evaluation and, after the second order of evaluation is determined, evaluating the merge candidates in the second order of evaluation excluding a merge candidate whose evaluation has already been started.

* * * * *